United States Patent [19]

Franz

[11] B 3,923,485

[45] Dec. 2, 1975

[54] METHOD OF FABRICATING A FLUOROCARBON-FILLED MULTIPLE GLAZED WINDOW UNIT

[75] Inventor: Helmut Franz, Pittsburgh, Pa.

[73] Assignee: PPG Industries, Inc., Pittsburgh, Pa.

[22] Filed: Dec. 28, 1973

[21] Appl. No.: 429,442

[44] Published under the Trial Voluntary Protest Program on January 28, 1975 as document no. B 429,442.

[52] U.S. Cl. .............................. 65/24; 65/43; 65/58
[51] Int. Cl.² ........................................ C03B 23/24
[58] Field of Search ...................... 65/24, 26, 43, 58

[56] References Cited
UNITED STATES PATENTS

| | | | |
|---|---|---|---|
| 2,725,320 | 11/1955 | Atkeson et al. | 65/24 X |
| 3,360,351 | 12/1967 | Murray et al. | 65/24 |

Primary Examiner—Arthur D. Kellogg
Attorney, Agent, or Firm—Donald Carl Lepiane; William J. Uhl

[57] ABSTRACT

An improved method for fabricating a welded fluorocarbon-filled multiple glazed window unit made from a pair of rigid transparent sheets is disclosed. The improvement of the invention resides in treating the pair of rigid transparent sheets which are subsequently welded together around their edges to form the multiple glazed unit with a high purity, finely divided silica powder. The sheets are then placed in face-to-face contact with one another, preheated and then heated to fuse the edge portions of the sheets together. The use of the high purity silica powders prevents the sheets from sticking together during preheating and insures that when the units are filled with a fluorocarbon gas, the fluorocarbon will not be photochemically decomposed upon exposure to solar radiation.

3 Claims, No Drawings

METHOD OF FABRICATING A FLUOROCARBON-FILLED MULTIPLE GLAZED WINDOW UNIT

BACKGROUND OF THE INVENTION

1. Field of the Invention

This invention relates to an improved method for producing a welded fluorocarbon-filled multiple glazed window unit and, in particular, to a method for treating the surfaces of the glass sheets during the manufacture of such a unit.

2. Brief Description of the Prior Art

Multiple glazed window units are made of two parallel spaced-apart glass sheets which are welded around their edges. The space between the glass sheets is usually either filled with air, or alternately it may be filled with an insulating gas such as fluorocarbon. See, for example, U.S. Pat. Nos. 3,683,974 to Stewart, et al., and 3,735,553 to Houser, both of which relate to fluorocarbon-filled multiple glazed units. The fluorocarbon-filled units are of particular interest in cold climates because of their improved insulation effectiveness over a comparable air-filled unit. However, fluorocarbon-filled units have certain problems associated with them not normally associated with air-filled units. Many fluorocarbon-filled multiple glazed units form an unsightly iridescent pattern or uneven mottled haze on the interior glass surface after the units have been exposed for sometime to solar radiation. The particularly observed iridescent pattern does not occur in comparable air-filled units.

It is believed that the discoloration of the fluorocarbon-filled multiple glazed units is directly related to the decomposition of the fluorocarbon, more particularly being caused by a heavy metal ion catalyzed photo-oxidation of the fluorocarbon to produce among other things hydrogen fluoride which then attacks the glass forming silicon tetrafluoride which results in an unsightly iridescent pattern. The photo-oxidation is believed to occur through the agency of three cooperating variables, namely, the exposure of the units to solar radiation, the presence of oxygen due to about 15 to 30 percent by volume of residual air in the unit (due to difficulties in completely filling the unit with flurocarbon gas), and the presence of heavy metal compounds and ions deposited and adsorbed on the interior surface of the glass. Since the fluorocarbon-filled multiple glazed units are designed to be exposed to solar radiation, and since it is difficult to remove all residual air from the units when filling the units with fluorocarbon, a potential solution to the problem would be the removal of the heavy metal contaminants from the interior surface portions of the glass.

Heavy metal ion and compound contamination can come from a variety of sources. One source, however, has been identified as the diatomaceous earth which has been recommended in the art (see, for example, U.S. Pat. No. 3,360,351 to Murray, et al.) as a separating agent to keep the two glass sheets separated in the preheating step of the fabrication scheme for preparing multiple glazed units.

To understand the source of heavy metal contamination in multiple glazed units, an understanding of the fabrication process should be appreciated. In fabricating welded multiple glazed units, two glass sheets are placed on a conveyor line and carried in sequence through a washing, rinsing and drying operation. After drying, the glass sheets are positioned in a slightly spaced-apart superimposed face-to-face relationship for a preheating and welding operation. In preheating, the glass sheets are heat treated in a special preheat furnace in order to avoid thermal shock to the glass sheets during a subsequent welding operation. Welding takes place in a furnace at a temperature of about 800°–850°F. and is accomplished by passing an electric current through a stripe of electrically conductive material which has been previously positioned around the edges of the sheets. The margins of the top or upper sheets are heated in this manner until they droop and become welded to the margins of the bottom or lower sheet. The units are then annealed, cooled and then filled with a fluorocarbon gas such as described in the aforementioned Stewart, et al., and Houser patents.

In the manufacturing process, such as described above, there is a tendency for the glass sheets to fuse together during preheating, thus interfering with their separation in preparation for the welding operation. This problem can be overcome if the surfaces of the glass sheets which are placed adjacent to one another are sprayed with diatomaceous earth, as described in the aforementioned Murray, et al., patent, which prevents the two superimposed glass sheets from sticking together. However, diatomaceous earth is not a particularly pure material, being formed from the siliceous skeletons of pre-historic unicellular algae. The diatomaceous earth contains trace quantities of heavy metal compounds such as $TiO_2$ and various chromium, ferric and molybdenum compounds which can be deposited or adsorbed on the interior surfaces of the glass and present sites for catalytic photo-oxidation of the fluorocarbon gas.

It is therefore an object of this invention to provide a method for fabricating a welded fluorocarbon-filled multiple glazed unit which does not form an unsightly iridescent pattern on the interior glass surfaces upon exposure of the unit to solar radiation.

More particularly, it is an object of this invention to provide a fluorocarbon-filled multiple glazed unit in which the interior surfaces of the glass are free from heavy metal contaminants which catalyze the photo-oxidation of the fluorocarbon present in the multiple glazed units.

It is yet another object of this invention to provide a method of fabricating a welded fluorocarbon-filled multiple glazed unit in which a separating agent is employed which does not deposit heavy metal contaminants on the surface of the glass in proportions which will cause photochemical oxidation of the fluorocarbon.

SUMMARY OF THE INVENTION

The present invention provides a means by which the above problems may be successfully eliminated. Briefly, it has been discovered that a pair of glass sheets can be superimposed one on top of the other, and then preheated to the desired temperature for welding without incidence of the above-mentioned problems. In the practice of the present invention, this is accomplished by treating, such as by uniformly spraying, the glass sheet surfaces that are placed adjacent to one another with a high purity, finely particulated silica material which is substantially free of compounds of titanium, chromium, iron, tin, vanadium and molybdenum. The high purity, finely divided silica is usually dispersed in a suitable liquid carrier such as deionized water and the mixture is then sprayed onto one or more, preferably a single interior surface of one of the glass sheets prior to the time that they are stacked together. The use of the liquid carrier permits ease of handling and enhances the uniform deposition of the separating material on the glass sheet surface. The high purity, finely divided silica can be used in the fabrication of fluorocarbon-filled multiple glazed units without the danger of the unit discoloring upon exposure to solar radiation. Comparable units made with diatomaceous earth quickly discolor.

PERTINENT PRIOR ART

Besides the prior art mentioned above, the following patents appear to be relevant to the practice of this invention but do not disclose or suggest the inventive concept: U.S. Pat. No. 2,486,153 to Gwyn, U.S. Pat. No. 2,725,320 to Atkeson, et al., and U.S. Pat. No. 3,071,501 to Cowley, et al.

index of such high purity silica materials is about 1.46 and the X-ray structure of the silica is amorphous. A 4 percent by weight aqueous dispersion of the finely divided high purity silica material has a pH of about 3.3 to 4.4. Suitable high purity finely divided silica such as described above is commercially available from the Cabot Corporation under the trademark CAB—O—SIL and from Degussa Inc. under the trademark AEROSIL. Examples of various grades of CAB—O—SIL which are useful in the practice of the invention are CAB—O—SIL M-5, MS-5, H-5, HS-5, EH-5, M-7, MS-7, M-7D and AEROSIL 200 and 300. The chemical and physical properties of the various grades of CAB—O—SIL are shown in the table below:

Table I

| CAB-O-SIL Grades | M-5 | MS-5 | H-5 | HS-5 | EH-5 | M-7 | MS-7 | M-7D |
|---|---|---|---|---|---|---|---|---|
| | | | Variable Properties | | | | | |
| Surface area, m²/gm (BET) | 200 ± 25 | 200 ± 25 | 325 ± 25 | 325 ± 25 | 390 ± 40 | 200 ± 25 | 200 ± 25 | 200 ± 25 |
| Particle size, micron | 0.012 | 0.012 | 0.007 | 0.007 | 0.007 | 0.012 | 0.012 | 0.012 |
| Density, lbs./cu. ft. | 2.3 max. | 2.3 max. | 2.3 max. | 2.3 max. | 2.3 max. | 4.0 ± 0.2 | 4.0 – 5.0 | 6.0 min. |
| Moisture content (105°C.) | 1.5% | 1.5% | 4.0% | 2.5% | 5.0% | 1.5% | 1.5% | 1.5% |
| Ignition loss (1000°C. moisture-free basis) | 1% | 1% | 2% | 2% | 2.5% | 1% | 1% | 1% |
| pH (4% aqueous dispersion) | 3.5–4.2 | 3.6–4.1 | 3.5–4.2 | 3.6–4.1 | 3.5–4.2 | 3.5–4.2 | 3.6–4.2 | 3.5–4.2 |
| Net weight per bag (lbs.) | 10 | 10 | 10 | 10 | 10 | 20 | 20 | 20 |
| Identical Properties - All Grades | | | | | | | | |
| Bulking value, gallons per 100 lbs. | 5.5 | | | | | | | |
| 325 mesh residue - max. | 0.02% | | | | | | | |
| Silica content | 99.8% | | | | | | | |
| Specific gravity | 2.2 | | | | | | | |
| Refractive index | 1.46 | | | | | | | |
| Color | White | | | | | | | |
| X-ray structure | Amorphous | | | | | | | |

DETAILED DESCRIPTION

The parting agent which is used in the practice of the invention is a high purity, finely divided silica. By high purity is meant that the parting agent contains greater than 98 percent $SiO_2$, preferably greater than 99 percent $SiO_2$, and is substantially free of compounds of chromium, titanium, tin, iron, vanadium and molybdenum. By substantially free is meant that the high purity silica contains less than 2 percent of the aforementioned compounds. By finely divided is meant that the parting material will have a particle size smaller than 40 millimicrons in diameter, and preferably smaller than 10 millimicrons in diameter. Such high purity, finely divided silica can be obtained by the hydrolysis of silicon tetrachloride at 1,100°C.,

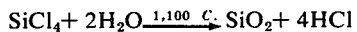
$$SiCl_4 + 2H_2O \xrightarrow{1,100\ °C} SiO_2 + 4HCl$$

The silica produced by the above high temperature hydrolysis is colloidal in nature and of extremely high purity. Such material is referred to in the art as fumed or pyrogenic silica. Besides the high purity and small particle size described above, the surface area of such material is very high, that is, greater than about 200 square meters per gram, nitrogen absorption according to the method described by Emmett, Brunauer and Teller in *Journal of the American Chemical Society*, 56, 35 (1934) and 57, 1954 (1935). The specific gravity of such materials are usually within the range of 2.0 to 2.5 and the ignition loss at 1,000°C. (on a moisture-free basis) is about 0.5 to 3 percent by weight. The refractive The parting agents described above are preferably employed as dispersions or suspensions in a suitable liquid carrier. When employed as dispersions or suspensions, the parting agents can be most evenly applied to the glass with conventional spraying equipment. The material does not have to be suspended, however, and can be applied directly to the glass sheet surfaces by hand sprinkling or dusting prior to the sheets being stacked in face-to-face relationship. When applied in this manner, a mechanical vibrator should be used to insure uniform distribution of the material. However, suspending the materials in a carrier is preferred. Of the liquid carriers which can be used, deionized water is preferred because of its cheapness and ready availability. Also, deionized water is relatively inert to glass, that is, will not smear or haze the glass under the spraying conditions employed in the practice of the invention. Besides water, anhydrous liquid carriers can also be employed. Practically any organic anhydrous liquid having a low boiling point, that is, not greater than 100°C. at one atmosphere of pressure, and a liquid that will not react with the high purity silica or leave a residue on the glass will be satisfactory. For example, ketones like acetone, esters such as ethyl acetal and chlorinated aliphatic compounds such as ethylene dichloride can be used. From a practical standpoint, however, alcohols such as methanol and ethanol are preferred because of their cheapness. Mixed carrier systems, such as deionized water-alcohols or deionized water-ketone mixture can also be employed.

The concentration of the high purity silica in the carrier should be about 0.5 to 5 percent by weight based on total weight of the suspension, that is, weight of silica plus weight of the carrier. Concentrations within the prescribed range suspend in water under slight agitation so that the suspension can be sprayed with commercially available spray equipment.

When the solutions are used in the above-recommended concentrations, about 1 to 5 milliliters of suspension is required for each square foot of glass being sprayed, presuming a light but even spray.

In spraying of the glass, it has been found desirable to hold the spray gun approximately 1 to 2 feet away from the glass surface being sprayed and to deposit the spray in the form of a fine mist on the glass surface. One must be careful not to deposit thick layers or a heavy mist of liquid upon the sprayed surface. Thick layers and large deposits tend to evaporate in a manner that causes the deposited material to build up in the heavy localized concentrations. This results from the tendency of large liquid masses to evaporate from the peripheral areas. Thus, due to the surface tension of the liquid carrier, the dispersed material tends to be drawn into the central or last portion of the liquid to evaporate, thereby building up a heavier concentration of dispersed materials than is desired. Such spot concentrations can result in an objectionable unit.

When the high purity silica is used within the prescribed concentration range, it results in the most even distribution of material on the glass surface. Concentrations of silica higher than recommended result in suspensions which are too viscous to be easily sprayed. The distribution of the silica is uneven resulting in an optically unsightly unit. Concentrations of high purity silica lower than the recommended amounts do not provide a desirable amount of separating material so that the glass sheets can be sprayed quickly under fast production conditions.

Typical production processes for making welded double glazed window units are disclosed in U.S. Pat. Nos. 2,624,979 and 2,999,036 to W. R. Cleaver, et al. As disclosed therein, a top and bottom glass sheet (top and bottom having reference to their relative positions during welding) are placed on a roller conveyor line and carried in sequence through a washing, rinsing and drying operation. Immediately thereafter, the top sheet is striped with an electrically conductive material, such as colloidal graphite, near the edges of the sheet. The strip extends continuously around the periphery of the sheet and may be either on the top or bottom surface of the top sheet. The glass sheets may be in side-by-side position when striped or one sheet may be in vertical alignment with the other sheet. The unstriped glass sheet is then sprayed with the high purity silica parting agent as described above and is then positioned in superimposed, face-to-face relation with the striped glass sheet operations. The silica parting agent is on the interfacial surface of the sheets.

After the sheets are superimposed and aligned in the above manner, they are placed in a charging case for the preheating, heat treated for a period of from 40 seconds to 2 minutes, depending on the size and thickness of the glass sheet, on a preheat furnace having an ambient temperature of approximately 1,300°F. During preheating, the glass sheets are heated to a temperature of approximately 600°–800°F. in order to avoid thermal shock to the glass sheets during the subsequent welding operation.

After the superimposed glass sheets are heat treated, they are conveyed into the welding furnace where the ambient temperature is approximately 800°–850°F. Upon obtaining the desired position in the welding furnace, vacuum chucks cause the superimposed sheets to be separated in slightly spaced relationship to one another. The welding operation is then effected on the thus-separated glass sheets.

Welding is accomplished by placing an electric current through the stripe of electrically conductive material to effect heating of the stripe and the glass immediately adjacent thereto. The margins of the top or upper sheet are heated in this manner until they droop and become welded to the margins of the bottom or lower sheet. The vacuum chuck is then operated to pull the top sheet upwardly to provide a chamber between the sheets. During this movement, the air pressure within the chamber is abruptly increased by permitting air from a pressurized external source to enter the unit through a pore opening provided in a face or an edge of the unit. This operation effects filleting of the welded connection between the sheets. The pore opening then allows for equalization of the air pressure inside and outside the unit during subsequent annealing and cooling.

After cooling, the units are generally filled with a fluorocarbon gas such as described in the aforementioned U.S. Pat. Nos. 3,683,974 to Stewart, et al., and 3,735,553 to Houser.

The term fluorocarbon gas, as used herein, is intended to include all normally gaseous fluorine-containing hydrocarbons having 1 to 4 carbon atoms, including compounds which may contain other halogen or hydrogen atoms in addition to the fluorine present. Included among the fluorocarbon compounds that are contemplated are: trichloromethane, chlorotrifluoromethane, tetrafluoromethane, hexafluoroethane, bromotrifluoromethane, chlorodifluoromethane, chloropentafluoroethane, chlorodifluoromethane, chloropentafluoroethane, dichlorodifluoromethane, 1,1-difluoroethane, with chlorodifluoromethane being preferred because of its low boiling point, good insulation properties coupled with cheapness and ready commercial availability. The fluorocarbon gases are commercially available from E. I. du Pont de Nemours and Company under the trademark FREON and from Allied Chemical Company under the trademark GENETRON.

EXAMPLES

Example I

The following example sets forth the best mode contemplated by the inventor for carrying out his invention.

A series of multiple glazed window units were prepared on a continuous basis as described generally in the method of U.S. Pat. No. 2,624,979. As disclosed therein, a top and bottom glass sheet of approximately 20 by 36 by 0.090 inch (reference being to the relative position during welding) were placed on a roller conveyor line and carried in sequence through a washing, rinsing and drying operation as described above. The washing was conducted in an aqueous cleaning solution containing 250 parts per million (ppm) sodium metasilicate, 30 ppm of a non-ionic surfactant sold under the trademark PLURONIC L-31, the concentrations of sodium metasilicate and non-ionic surfactant being based on parts by weight per million parts by weight of water. Rinsing was done with deionized water and drying in a hot air heater at 100°F. Immediately after drying, the top sheet was striped with an electrically conductive material, such as colloidal graphite, near the edges of the sheet. The strip extends continuously around the periphery of the sheet. The glass sheets were in side-by-side position when striped. One of the surfaces of the unstriped glass sheet was then sprayed with a deionized water dispersion of high purity pyrogenic silica, sold under the trademark CAB—O—SIL M-5, the properties of which are set forth in the table above. The concentration of the silica dispersion was about 0.1 percent by weight based on total weight of silica and deionized water and the spray was applied evenly such that about 2.3 liters of dispersion was applied to each square foot of glass. The glass sheets were then positioned in superimposed, face-to-face relationship with the CAB—O—SIL being on the innerfacial surface therebetween. The sheets were placed on the charging car for preheating and welding.

After the sheets had been superimposed and aligned in the above manner, they were heat treated for a period of about 1 minute on a preheat furnace having an ambient temperature of approximately 1,120°F. During preheating, the glass sheets were heated to a temperature of approximately 850°F. in order to avoid thermal shock to the glass sheets during the subsequent welding operation.

After the superimposed glass sheets were heat treated, they were conveyed to a welding furnace where the ambient temperature was approximately 890°F. Upon obtaining the desired position in the welding furnace, vacuum chucks caused the superimposed sheets to be separated in slightly spaced relationship to each other. The welding operation was then effected on the separated glass sheets.

Welding was accomplished by passing an electric current through the stripes with electrically conductive material to effect heating of the stripe and the glass immediately adjacent thereto. The margins of the top or upper sheet were heated in this manner until they drooped and became welded to the margins of the bottom or lower sheet. The vacuum chuck was then operated to pull the top sheet upwardly to provide a chamber between the sheets. During this movement, the air pressure within the chamber was abruptly increased by permitting air from a pressurized external source to enter the unit through a pore opening provided in a face or an edge of the unit. This operation effected filleting of the welded connection between the sheets. The pore opening then allowed for equalization of the air pressure inside and outside the unit during subsequent cooling and annealing.

After cooling, the units were filled with a fluorocarbon gas, $CHClF_2$, commercially available from Allied Chemical Company under the trademark GENETRON, such as disclosed in U.S. Pat. No. 3,735,553. After the units had been filled with fluorocarbon (i.e., about 85 percent of the volume being fluorocarbon and the remaining 15 percent being air), the units were sealed by soldering closed the metal eyelet which served as the pore opening.

A number of sealed units were then exposed to accelerated testing to determine if the units would be suitable for use for prolonged exposure to solar radiation. The accelerated testing employed consisted of exposing the units to a source of near ultraviolet radiation, that is, a source radiating at 320–400 millimicrons. The specific light source which was used was a General Electric Company photochemical black light known as Type F 40BLB. Testing was conducted until an iridescent film or a mottled haze appeared on the interior surfaces of the units or until no change occurred in the units after at least 450 hours of continuous exposure.

After 3,000 hours of testing, the units evidenced no discoloration or iridescent patterns on the interior surfaces of the glass. Infrared spectrophotometry analysis of the units showed evidence of a major portion of $CHClF_2$ and no evidence of $CHClF_2$ decomposition products.

Example II

When the procedure of Example I above was repeated with the exception that diatomaceous earth sold by Johns-Manville under the trademark CELITE 50D was used in the place of CAB—O—SIL, each testing multiple glazed unit failed after 20 hours of accelerated testing. An iridescent film formed on the interior surface of the glass. Infrared analysis of the units showed substantial amounts of $CHClF_2$ decomposition products, namely, $CO_2$, $HCl$, $COF_2$ and $COCl_2$ and evidence of HF attack on the glass surface by the detection of $SiF_4$. The diatomaceous earth had the following chemical analysis:

| Ingredient | Percent by Weight |
|---|---|
| $SiO_2$ | 93.08 |
| $Na_2O$ | 2.14 |
| $K_2O$ | 0.36 |
| $CaO$ | 0.26 |
| $MgO$ | 0.41 |
| $SO_3$ | Trace |
| $Cl^-$ | Trace |
| $Al_2O_3$ | 2.28 |
| $ZrO_2$ | Trace |
| Moisture at 110°C. | 0.12 |
| Ignition loss above 950°C. | 0.39 |

Adsorption Spectrophotometric Analysis indicated that the diatomaceous earth contained 0.84 percent by weight $Fe_2O_3$ and 0.02 percent by weight $TiO_2$. Also qualitative emission spectrographic analysis indicated that the diatomaceous earth also contained trace amounts of vanadium, molybdenum, chromium, barium, strontium, boron, nickel, silver, copper and manganese. As the following examples will show, as little as trace amounts of some of the above elements can be adsorbed on the glass surface as metal cations or deposited on the glass surface as metal compounds leading to contamination and failure of resultant fluorocarbon-filled multiple glazed units.

Example III

A series of laboratory-sized multiple glazed units were prepared from 14 × 14 × 0.090 inch glass sheets. The glass sheets were treated in the following manner. The glass sheets were first thoroughly cleaned, rinsed with deionized water and then blown dry. Next, aqueous treating solutions at a temperature of 140°F. and containing from 1 to 1,000 parts per million of various heavy metal ions were puddled on the glass surface and kept there for 10 minutes. The treating solutions were then decanted off the glass sheets and the surfaces blown dry with air. The glass sheets were then assembled into multiple glazed window units and filled with $CHClF_2$ as generally described in Example I. The filled units were then exposed to near ultraviolet radiation in the accelerated testing procedure as described above in Example I. The results of the testing are presented in the following table.

TABLE II

Accelerated Testing Results of Contaminated Fluorocarbon-Filled Multiple Glazed Window Units

| Treating Solution | Concentration in parts per million | Test Time (days) | Test Results Good | Failure |
|---|---|---|---|---|
| Control - untreated surface | | 125 | X | |
| $CrCl_3$ | 1000 | 1 | | X |
| $CrCl_3$ | 100 | 1 | | X |
| $CrCl_3$ | 10 | 4 | | X |
| $CrCl_3$ | 1 | 4 | | X |
| $Cr_2O_3$ | 1000 | 2 | | X |
| $Cr_2O_3$ | 100 | 2 | | X |
| $Cr_2O_3$ | 10 | 5 | | X |
| $Cr_2O_3$ | 1 | 120 | X | |
| $TiO_2$ | 1000 | 2 | | X |
| $TiO_2$ | 100 | 2 | | X |
| $TiO_2$ | 10 | 8 | | X |
| $TiO_2$ | 1 | 60 | | X |
| $V_2O_5$ | 1000 | 1 | | X |
| $V_2O_5$ | 100 | 8 | X | |
| $V_2O_5$ | 10 | 16 | | X |
| $V_2O_5$ | 1 | 60 | | X |
| $SnCl_2$ | 1000 | 90 | | X |
| $SnCl_2$ | 100 | 90 | X | |
| $SnCl_2$ | 10 | 90 | X | |
| $SnCl_2$ | 1 | 21 | X | |
| $SnCl_4$ | 1000 | 1 | | X |
| $SnCl_4$ | 100 | 5 | | X |
| Activated Alumina | 1000 | 14 | | X |
| $AlCl_3$ | 1000 | 37 | | X |
| $FeCl_3$ | 1000 | 10 | | X |
| $FeCl_3$ | 10 | 65 | X | |
| $CuCl_3$ | 1000 | 40 | X | |
| $CuCl_2$ | 1000 | 40 | X | |
| $ZrCl_2$ | 1000 | 29 | X | |
| $Cu_2(SO_4)_3$ | 100 | 40 | X | |
| $Fe_2(SO_4)_3$ | 1000 | 47 | X | |
| $FeSO_4$ | 1000 | 40 | X | |
| $K_2SO_4$ | 1000 | 40 | X | |
| $MnSO_4$ | 1000 | 47 | X | |

TABLE II (Cont.)

Accelerated Testing Results of Contaminated Fluorocarbon-Filled Multiple Glazed Window Units

| Treating Solution | Concentration in parts per million | Test Time (days) | Test Results Good | Failure |
|---|---|---|---|---|
| $Ce_2(SO_4)_2$ | 1000 | 22 | | X |
| $MgSO_4$ | 1000 | 38 | X | |
| $Sb_2O_3$ | 1000 | 60 | | X |
| $Ba(OH)_2$ | 1000 | since 1/26/73 | X | |
| $Co(O-C(=O)-CH_3)_2$ | 1000 | 27 | X | |
| $Ni(NO_3)_2$ | 1000 | 27 | X | |
| $NaNO_3$ | 1000 | 29 | X | |
| $MoO_2$ | 1000 | 17 | | X |
| wolfram anhydride | 1000 | 42 | | X |
| $MnO_2$ | 1000 | 90 | X | |

The above testing shows that chromium, vanadium and titanium compounds appear to be most effective catalyst for the photo-oxidation decomposition of the fluorocarbon. Relatively low treating solution concentration cause unit failure in relatively short periods of time. The next most effective catalyst appears to be stannic compounds, followed by stannous, ferric, molybdenum, activated alumina and ceric compounds and finally followed by tungsten compounds. Compounds such as aluminum chloride, inactivated alumina, cupric and cuprous salts, zirconium salts, ferrous salts, sodium and potassium salts, manganese salts, magnesium salts, barium and nickel salts apparently have little effect on the fluorocarbon.

From the above data, it has been determined that the concentrations of adsorbed chromium ion, measured as $Cr_2O_3$, and deposited $TiO_2$ in concentrations of as low as 0.01 micrograms per square inch of glass surface can contaminate the glass and lead to unit failure. With other contaminants, such as stannic ion and ferric ion, somewhat higher concentrations, estimated to be on the order of about 0.05 micrograms per square inch, present a definite potential for unit failure. By far, however, adsorbed chromium ion and deposited $TiO_2$ are the most dangerous contaminants and appear to be two of the most prevalent impurities present in diatomaceous earth. It is estimated that their concentration on the glass surface must be controlled to less than 0.01 micrograms per square inch of glass surface.

The concentrations of adsorbed metal ions and deposited articles can be determined by striping the glass surface with concentrated sulfuric acid and then determining the chromium content (measured as $Cr_2O_3$) and $TiO_2$ content of the striping solution by standard comparative colormetric techniques.

Also, although not explicitly indicated from the above data, it appears that the photo-oxidation decomposition can be caused by either adsorbed metal ions or deposited metal compounds. The adsorbing metal cations are those which are soluble in the liquid carrier for the diatomaceous earth, e.g., water, and include $Cr^{+2}$, $Cr^{+3}$, $Sn^{+2}$, $Sn^{+3}$ and $Fe^{+3}$. The metal compounds are insoluble in the aqueous carrier and deposit from the carrier onto the surface of the glass. Such metal compound deposits include $TiO_2$, $Al_2O_3$, $V_2O_5$ and $MoO_2$.

The existence of two types of catalyst for photo-oxidation decomposition has been substantiated in a series of experiments in which the glass surface was first treated with a dodecyl trimethyl ammonium bromide, a cationic surfactant which strongly adsorbs at the glass surface and forms an adsorption barrier for the metal cations. Fluorocarbon-filled multiple glazed units in which the glass sheets were treated with contaminated solution containing 80 ppm of $Cr^{+2}$, $Cr^{+3}$, $Sn^{+2}$, $Sn^{+3}$ and $Fe^{+3}$ ions and about 0.1 percent by weight (based on weight of solvent) of dodecyl trimethyl ammonium bromide did not fail after 500 hours of testing. The use of adsorption inhibitors, however, did not prevent unit failure due to deposition of insoluble solid catalyst such as $TiO_2$. Fluorocarbon-filled multiple glazed units in which the glass sheets were treated with aqueous solutions containing 100 ppm $TiO_2$ and 0.1 percent by weight (based on weight of water) of dodecyl trimethyl ammonium bromide failed after 2 days of testing.

I claim:
1. In a method of fabricating a welded, fluorocarbon-filled multiple glazed window which involves the steps of cleaning a pair of glass sheets, depositing a separating agent on at least one of the surfaces of the glass sheets, placing the sheets in face-to-face contact such that the separating agent is between the facing surfaces of the sheets, preheating the sheets while in face-to-face contacting relationship and then finally heating the sheets to fuse the edge portions of the sheets together, the improvement comprising:
   a. depositing a finely divided silica containing greater than about 98 percent by weight silica as the separating agent between the facing surfaces of the glass sheets; said silica being substantially free of chromium, titanium, tin, iron, vanadium and molybdenum.
2. The method of claim 1 in which the silica contains greater than about 99 percent by weight silica.
3. The method of claim 2 in which the silica particle size is smaller than 10 millimicrons.

* * * * *